May 30, 1944.   C. L. HALL   2,350,311
RETAINING DEVICE
Filed June 14, 1941
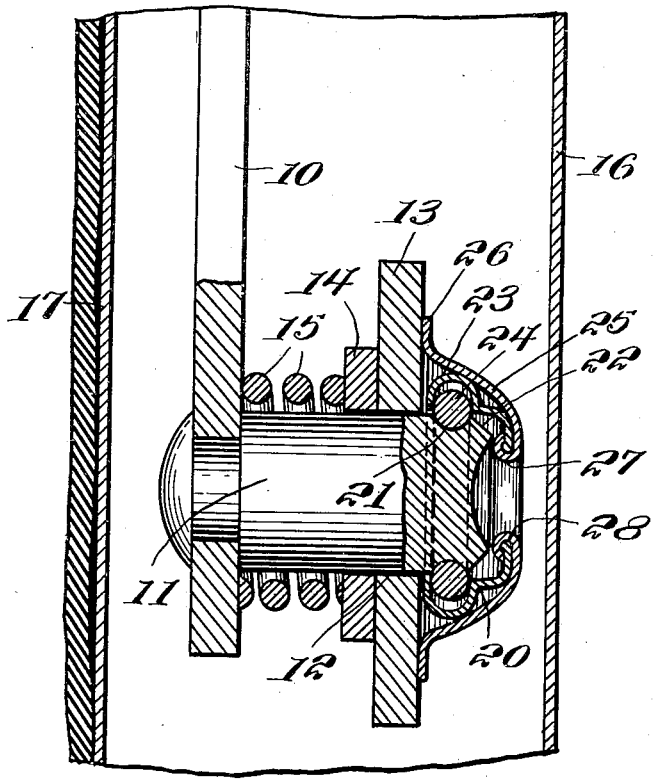
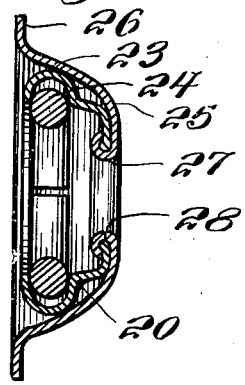
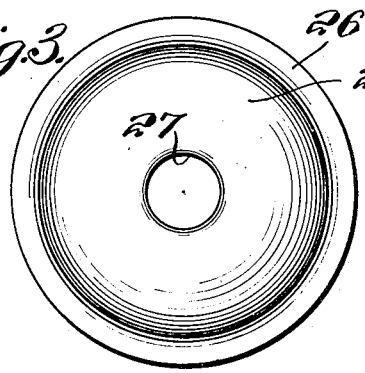
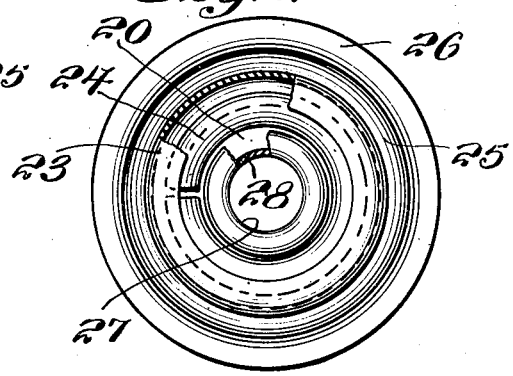
INVENTOR.
Charles L. Hall.
By John Todd Attorney.

Patented May 30, 1944

2,350,311

UNITED STATES PATENT OFFICE 2,350,311

RETAINING DEVICE

Charles L. Hall, Detroit, Mich., assignor to United-Carr Fastener Corporation, Cambridge, Mass., a corporation of Massachusetts Application June 14, 1941, Serial No. 398,083

3 Claims. (Cl. 85—5)

The present invention relates to an improved fastening adapted for use on machine elements where it is desired to provide means for preventing one part from moving axially from an operating pin or stub.

More particularly the invention aims to improve the construction and facilitate the assembly of operation mechanism, particularly regulator mechanism for motor vehicle windows, by providing an improved cap fastening adapted for snap fastening engagement with the regulator pin to prevent the operating arm or slide from being displaced axially from the pin.

Heretofore, in such devices it has been common practice to provide a cotter pin or like wire fastening extending through an aperture in the pin or stub to prevent an operating part from moving axially off of the pin or stub. In the assembly of certain structures, as for example, window regulators, which are confined between a door panel and upholstery panel of a motor vehicle door, the end of the pin or stub is often inaccessible and hidden from the view of the workman, with the result that the cotters are often improperly and insecurely positioned. Usually a washer is interposed between the operating member and the cotter.

My invention aims to improve upon the above described construction by providing a snap fastened socket adapted for snap fastener engagement with the end of the pin or stub, which will act effectively to prevent the operating part from moving axially off of the slide. In the preferred form of the invention the snap fastener socket is combined with a cup-shaped washer, so that the washer and fastening may be quickly and conveniently snapped over the pin stub as a unit.

Other aims and advantages of the invention will be apparent from the following more detailed description of a preferred embodiment of the invention illustrated in the accompanying drawing, in which Fig. 1 is a sectional view of my improved fastening as applied to a machine element in the form of a window regulator;

Fig. 2 is an enlarged sectional view of the combined fastening and washer illustrated in Fig. 1; and Figs. 3 and 4 are respectively, outer and inner elevations thereof.

Referring to the drawing, the conventional parts of the machine element may comprise a pin-carrying member 10, having a pin or stub 11 projecting laterally from one part thereof and adapted to fit into an opening 12 of a member 13 movable relative to the member 10.

In the preferred installation the member 10 may be the regulator arm of a motor vehicle window regulator, to one end of which is riveted a pin 11 to which is fitted an operating slide 12. The slide may be held spaced from the regulator arm by means of a washer 14 and coil spring 15, as shown in Fig. 1. The above described assembly is confined between a door panel 16 and upholstery panel 17.

According to the invention, the member 13 is retained on the pin or stub 11 by means of a cap 20 adapted for snap fastening engagement with the end of the pin 11. Advantageously the pin is formed with an annular U-shaped groove 21 near the outer end thereof and adjoining outer bevelled cam faces 22 thereon.

The cap 20 preferably comprises a cup-shaped member of a depth slightly greater than the distance between the inner edge of the groove 21 and the outer end of the pin, the inner edge of the flanges terminating in an inwardly opening annular groove 23 in which is seated a contractible locking rim 24.

In operation the cap 20 is merely snapped over the end of the pin 11 to force the locking ring 24 over the cam faces 22 and permitting them to snap into the groove. As the annular groove 23 is of larger diameter than the opening 12 in the part 13, the cap effectively retains the part 13 on the pin under ordinary working conditions.

It is often desirable to have a washer interposed between the movable part on the pin and the fastening, and according to one embodiment of the invention, such a washer may be associated with the cap 20.

In the illustrated embodiment the washer 25 comprises a cup-shaped member of larger diameter and depth than the cap 20 and adapted to house the cap. The cup-shaped washer 25 is preferably formed with an outer flat rim 26 adapted for free sliding engagement with the part 13. The central part of the washer may be perforated and inturned to form an integral tubular rivet member 27 adapted to extend through a central opening 28 in the cap 20 and to be clinched over the portion of the cap surrounding the aperture 28 for securing the parts together as a unit.

In certain installations, relative rotation between the pin 11 and washer 25 may be desirable, and this may be accomplished by loosely coupling the washer 25 and cap 20 together permitting relative rotation between these parts. On the other hand, the washer and cap may be fixedly coupled together and relative rotation effected between the locking ring and its cooperating flange groove 23.

As is illustrated in Fig. 1, the end of the pin 11 may be recessed or cupped to partly receive and house the clinched end of the tubular rivet 27, thus providing a compact installation occupying a minimum of space.

It will be apparent to those skilled in the art that while the invention is particularly useful in connection with the construction and assembly of motor vehicle window operators, it is not limited to such use but is applicable to many other uses when it is desired to secure a movable part on a supporting or operating pin.

My invention is not to be interpreted narrowly as limited to the specific constructions shown and described, which are intended merely as illustrations of the invention, but includes as well equivalent constructions as may fall within the scope of the appended claims.

I claim:

1. In combination with a pin having an annular groove near its end and a part movably mounted on said pin, of means for retaining said part on said pin, said means comprising a flanged cap adapted to fit over the end of said pin, the inner edge of said flange being formed with an inwardly opening annular groove, a contractible locking ring seated in said groove, a cup-shaped washer surrounding said cap and secured thereto to form an assembled unit, said washer having a flange portion extending beyond said locking ring to engage said movable part thereby to space said part from said means, said locking ring adapted to be expanded over said pin end and snapped into said pin groove whereby said cap and washer may be applied to said pin solely by a snap fastener action.

2. An assembled retaining cap and washer for pin operating installations of the type described, comprising a flanged retaining cap adapted to fit over the end of said pin, a cup-shaped washer of larger diameter and greater depth than said cap surrounding and housing said cap, means securing said cap and washer loosely together, and cooperating locking ring and groove elements on said cap and pin, whereby said cap and washer may be secured to said pin as a unit by a simple snap fastener action.

3. An assembled retaining cap and washer for pin operating installations of the type described, comprising a flanged retaining cap adapted to fit over the end of said pin, a cup-shaped washer of larger diameter and greater depth than said cap surrounding and housing said cap, a hollow rivet integral with said washer and extending through and clinched over said cap, and cooperating locking ring and groove elements on said cap and pin whereby said cap and washer may be secured to said pin as a unit by a simple snap fastener action.

CHARLES L. HALL.